United States Patent [19]

Bachman et al.

[11] Patent Number: 4,519,030

[45] Date of Patent: May 21, 1985

[54] UNIQUE MEMORY FOR USE IN A DIGITAL DATA SYSTEM

[75] Inventors: Brett L. Bachman, Boston; Ward Baxter, II, Carlisle, both of Mass.; Ronald H. Gruner; David L. Houseman, both of Cary, N.C.; Thomas M. Jones, Chapel Hill, N.C.; Stephen R. Redfield, San Jose, Calif.; Louis E. Drew, Princeton; Michael B. Druke, Chelmsford, both of Mass.

[73] Assignee: Data General Corporation, Westboro, Mass.

[21] Appl. No.: 266,420

[22] Filed: May 22, 1981

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,413,613 | 11/1968 | Bahrs | 364/200 |
| 3,675,209 | 7/1972 | Trost | 364/200 |
| 3,840,861 | 10/1974 | Amdahl | 364/200 |
| 3,858,183 | 12/1974 | Amdahl | 364/200 |
| 3,934,232 | 1/1976 | Curley | 364/200 |
| 4,068,300 | 1/1978 | Bachman | 364/200 |

*Primary Examiner*—Raulfe B. Zache
*Attorney, Agent, or Firm*—Joel Wall

[57] ABSTRACT

A digital data system having a memory with a unique multi-ported memory I/O means. Separate means are provided for communicating with any of several buses. Address information, operands, instructions and Input-/Output data may be separately sent and received over various of the buses.

3 Claims, 1 Drawing Figure

UNIQUE MEMORY FOR USE IN A DIGITAL DATA SYSTEM

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Also, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to the internal structure of a digital data system and in particular to the characteristics of a memory unit for use with a digital data system.

The data system is connected to the memory by means of four buses, each of which may be connected to one or several of three ports on the memory unit.

The First Bus connects the Input/Output portion of the data system (that portion responsible for communication with devices external to the system) to the First Port of the memory, and and carries memory addresses and data.

The Second, Third, and Fourth Buses all connect to the CPU portion of the data system.

The Second Bus carries to the Second Port addresses of operands requested by the CPU, and to the Third Port addresses of instructions requested by the CPU.

The Third Bus carries operands from the Second Port to the CPU, and instructions from the Third Port to the CPU.

The Fourth Bus carries operands from the CPU to the Second Port.

The aforementioned addresses that are input to the memory unit are conceived to provide the user with the appearance of an extremely flexible memory; although under present technology the memory bank must be constructed with a discrete word size the user is free to request information storage and retrieval in any word size he desires. Means are provided to transform the addresses from the data system (First Addresses) into addresses of the form to which the memory bank is responsive (Second Addresses) and to manipulate data between the user's arbitrary word-length form and the memory bank's fixed word-length form.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is still another object of the present invention to provide a simplified and flexible user interface to a data processing system.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

BRIEF DESCRIPTION OF DRAWINGS

The figure numbers in this application have two components, one indicating the chapter in which the figure is located and the other the sequential number of the figure within that chapter. Thus, FIGS. 1 through 20 refer to the Introduction, 101 to 110 to Chapter 1, and so forth. There are no FIGS. 21-100, 111-200, 275-300, or 308-400 in the application.

Figure 1:
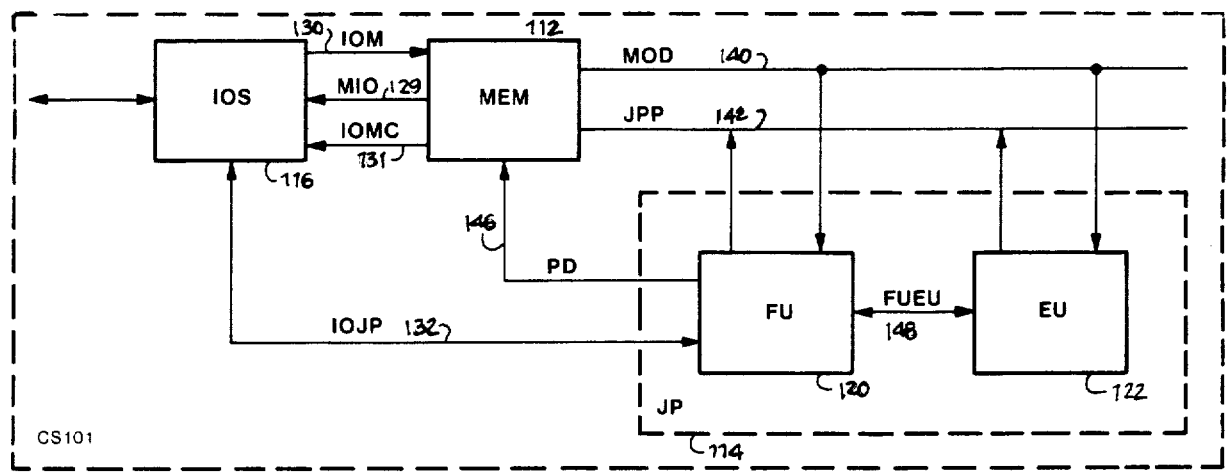
FIG. 1 is a partial block diagram of a computer system incorporating the present invention.

This application incorporates by reference the entire application, Ser. No. 266,402, filed on May 22, 1981, of Ward Baxter II et al.

More particularly, attention is directed to FIGS. 201 and 206-237 of the drawings in application Ser. No. 266,402, and to that part of the specification, particularly at pages 165-371 thereof, which relate to subject matter of the claims herein.

What is claimed is:

1. A memory system for use with a digital data system, said memory system comprising:
    memory I/O means connected from a first portion and from a second portion of said digital data system for interfacing between said digital data system and the remainder of said memory system;
    said remainder of said memory system including:
        (a) memory bank means for storing said data; and
        (b) memory control means adapted to receive first addresses from said memory I/O means and adapted to provide second addresses to both said I/O means and said memory bank means, for controlling operation of said memory bank means;
    said memory I/O means having first port means, second port means and third port means;
    first bus means connected between said first portion and said first port means for conducting first certain of said first addresses and first certain of said data therebetween;
    second bus means connected between said second portion and both said second port means and said third port means for conducting second certain of said first addresses therebetween, and for conducting third certain of said first addresses therebetween;
    third bus means connected between said second portion and both said second port means and said third port means for conducting second certain of said data therebetween, and for conducting third certain of said data therebetween;
    fourth bus means connected between said second portion and said second port means for conducting fourth certain of said data therebetween; and,
    formatting means responsive to operation of said memory control means for performing format manipulation operations upon said second certain of said data, and upon third certain of said data.

2. The memory of claim 1, wherein each one of said second certain of said first addresses comprises:
    an address field for identifying a location of a corresponding said second certain of said at least data or a corresponding said fourth certain of said at least data in said memory bank means,
    a length field for identifying the number of data bits in said corresponding second certain of said at least data or in said corresponding said fourth certain of said at least data,
    an operation field for identifying an operation to be performed by said memory means upon said corresponding second certain of said at least data or upon said corresponding said fourth certain of said at least data,
    a destination field for identifying a destination in said second certain portion of said digital data system for said corresponding said second certain of said at least data or a source in said second certain portion of said digital data system of said corresponding said fourth certain said at least data, and
    each one of said third certain of said addresses comprises
        an address field for identifying a location of a corresponding said third certain of said at least data in said memory bank means.

3. The memory system of claim 1 or 2 wherein the formatting means further comprises:
    means for shifting bits of said third certain of said data so that a first bit of said third certain of said data as received from the fourth bus occupies a first bit position of a storage location within the memory bank means; and
    means for shifting bits of said fourth certain of said data so that a first bit as retrieved from the memory bank means occupies a first bit position of said fourth certain of said data as output to the third bus;
    whereby data units of any arbitray number of bits may be stored within the stored in alignment with cells of the memory bank means.

* * * * *